(12) United States Patent
Suzuki et al.

(10) Patent No.: US 7,069,403 B2
(45) Date of Patent: Jun. 27, 2006

(54) METHOD AND APPARATUS FOR DATA DUPLEXING IN STORAGE UNIT SYSTEM

(75) Inventors: Tooru Suzuki, Tokyo (JP); Katsunori Nakamura, Tokyo (JP); Teruo Nagasawa, Tokyo (JP); Takahisa Kimura, Tokyo (JP); Takeshi Koide, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 16 days.

(21) Appl. No.: 10/685,718

(22) Filed: Oct. 14, 2003

(65) Prior Publication Data

US 2004/0078535 A1 Apr. 22, 2004

Related U.S. Application Data

(63) Continuation of application No. 09/839,713, filed on Apr. 19, 2001, now Pat. No. 6,665,781.

(30) Foreign Application Priority Data

Oct. 17, 2000 (JP) ..................... 2000-316743

(51) Int. Cl.
*G06F 12/16* (2006.01)

(52) U.S. Cl. ..................................... 711/162
(58) Field of Classification Search ............... 711/162, 711/167; 707/204; 714/6
See application file for complete search history.

(56) References Cited

U.S. PATENT DOCUMENTS

| | | | | |
|---|---|---|---|---|
| 5,799,141 A | * | 8/1998 | Galipeau et al. | 714/13 |
| 6,260,124 B1 | * | 7/2001 | Crockett et al. | 711/162 |
| 6,408,370 B1 | * | 6/2002 | Yamamoto et al. | 711/167 |
| 2001/0010070 A1 | * | 7/2001 | Crockett et al. | 711/162 |

OTHER PUBLICATIONS

"Digital Equipment Announces StorageWorks: Capacity Breakthrough for DSSI Systems Customers," Digital Equipment Corporation press release (Mar. 1994). 2 pages.

* cited by examiner

*Primary Examiner*—Hiep T. Nguyen
(74) *Attorney, Agent, or Firm*—Townsend and Townsend and Crew LLP

(57) ABSTRACT

With the purpose of achieving consistent non-synchronous copying of data from a plurality of primary side control units to a plurality of secondary side control units, all of the secondary side control units are connected via a loop, and each of the secondary side control units determines guarantee time by circulating a time added to the data received from the primary side control units via said loop communication route. A consistent data copying is guaranteed by circulating the determined guarantee time via the loop communication route.

20 Claims, 12 Drawing Sheets

METHOD AND APPARATUS FOR DATA DUPLEXING IN STORAGE UNIT SYSTEM

This application is a continuation of and claims priority to U.S. patent application Ser. No. 09/839,713, filed Apr. 19, 2001 now U.S. Pat. No. 6,665,781, which in turn claims priority to Japanese Patent Application No. 2000-316743, filed Oct. 17, 2000, and are incorporated by reference in their entirety for all purposes.

BACKGROUND OF THE INVENTION

The present invention relates to a storage unit system for performing duplexing of data (backup of data) between a primary side control unit connected to a processing unit (host computer) and a secondary side control unit connected to the primary side control unit.

As a method for carrying out duplexing a data between primary side and secondary side control units, a method is generally known, by which primary side and secondary side control units are connected via an interface cable, and the primary side control unit issues a write request received from a processing unit to a secondary side control unit, and duplexing of data is carried out.

Further, a method for duplexing of data is known, in which a primary side system and a secondary side system each provided with a plurality ("M" and "N" in numbers) of control units respectively and a write request is issued from the processing unit to "M" primary side control units. This method is disclosed in J-P-A-No. 85408/1999.

Where the primary side system and the secondary side system each has a plurality ("M" and "N" in numbers) of control units, each of the primary side control units adds a write time indicating time of issuance of the write request to the write request received from the processing unit (host), and issues a write request to each of the secondary side control units connected via the interface cable. Then, the write data and the write time are transmitted to the secondary side control units. On the other hand, in the secondary side system, one of the plural secondary side control units is designated as a master control unit, and the designated master control unit and the other secondary side control unit are connected on one-to-one basis via data transfer route. The secondary side control units other than the master control unit transmit information relating to the write time (write time from the host to the primary side control unit) of the write data received from the primary side control unit to the master control unit on the secondary side. The master control unit refers to the information relating to the write information received from all of the secondary side control units (including the write time information of the master control unit itself) and determines guarantee time. Here, guarantee time is defined as "a time, which can guarantee that all of the write data with the write time older than guarantee time (write time from the host to the primary side) on all of the secondary side control units have been received at all of the secondary side control units". Specifically, the determined guarantee time guarantees that all write data relating to all write requests issued from the processing unit to each of the primary side control units before the guarantee time have been received (already duplexed) at the secondary side control units. The master control unit notifies the determined guarantee time to all of the secondary side control units, and each of the secondary side control units can confirm that duplexing is guaranteed for the write data, which have write time older than the guarantee time. When this guarantee time is notified, even in case the data on the primary side is destroyed by some accident, for instance, the data from the primary side control unit received before the guarantee time can be utilized.

SUMMARY OF THE INVENTION

In the method as described above, in a system where primary and secondary side systems are provided with plural control units, guarantee time must be determined for the purpose of guaranteeing the duplexing of data and of using the secondary side data. In order to determine the guarantee time, communication must be performed twice for the secondary side control units other than master secondary side control unit, i.e. a communication for transmission of the information relating to the write time to the master control unit by each of the secondary side control units and a communication for notification of the guarantee time determined by the master control unit to each of the secondary side control units.

According to the method, process and communication for guaranteeing the duplexing of data are concentrated on the master control unit. Therefore, a problem arises in a system, which has a number of control units, i.e. communication performance and processing performance are decreased in the master control unit.

Further, in the method as described above, the master control unit must have functions and physical construction to perform communication with each of the other (N−1) secondary side control units. In particular, in case where there are many control units in the secondary side system, it is difficult that the master control unit has such functions and physical construction as to perform communication with all other secondary side control units.

Further, in the method as described above, for the case where trouble may occur in the master control unit, the functions as the master control unit should be dispersed to the secondary side control unit to give redundancy. In this connection, the functions and physical construction as the master control unit must be dispersed to each of the secondary side control units. This appears to be very difficult to accomplish.

To overcome the problems, it is an object of the present invention to decrease the number of communications between the secondary side control units and to achieve higher efficiency in the process to guarantee the duplexing of the write data.

It is another object of the invention to avoid concentration of the process to guarantee the duplexing of the write data on a single secondary side control unit, but to disperse the process to each of the secondary side control units.

It is still another object of the present invention to provide data duplexing means, which has no need to have a master control unit on the secondary side and which can achieve the duplexing of data even when there are many control units in the secondary side system (not influenced by the number of the control units in the secondary side system).

To attain the objects, the present invention provides a method for duplexing data in a storage unit system to carry out backup operation of data from a primary side system having one or more primary side control units to a secondary side system having one or more secondary side control units, the method having the steps of:

adding time information relating to a write time to a data of a write request and storing the information in a cache memory in the primary side control unit when there is a write request from a processing unit to the primary side control unit;

transmitting the stored write data and the time information to the secondary side control unit;

storing the write data and the time information to a cache memory in the secondary side control unit;

transmitting the time information stored in the cache memory in the secondary side control unit to another secondary side control unit via a communication route connecting the secondary side control units with each other;

comparing the time information of a first secondary side control unit received from a first primary side control unit with a time information transmitted from a second secondary side control unit, and transmitting an older time information to the next secondary side control unit via the communication route; and circulating the older time information between the plural secondary side control units, and determining data guarantee time for guaranteeing duplexing of the write data between the plural secondary side control units.

The other methods for executing the present invention will be described in detail in DESCRIPTION OF THE PREFERRED EMBODIMENT as given below.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENT

Figure 1:
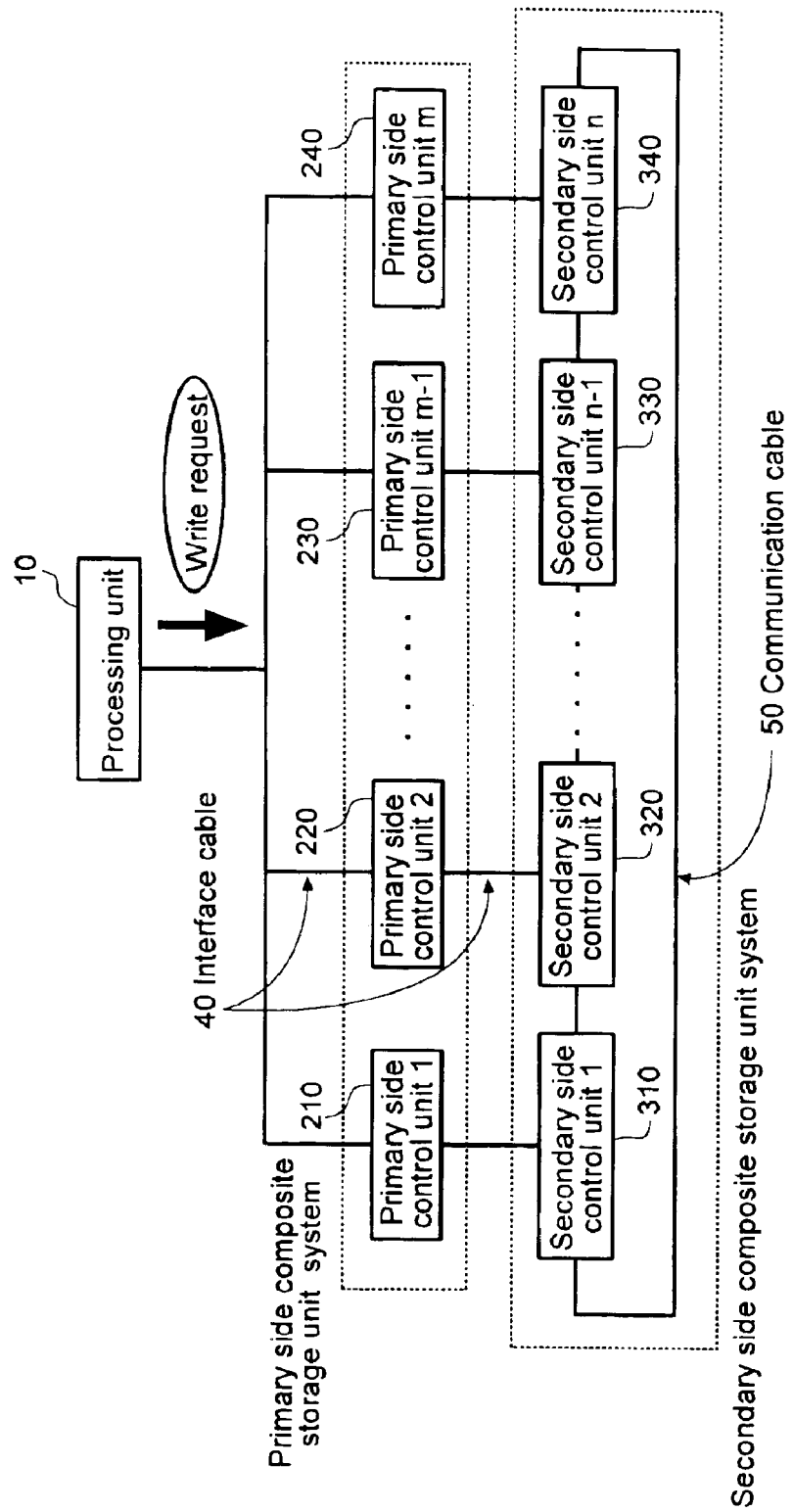
FIG. 1 is a schematical block diagram of a data duplexing system according to an embodiment of the present invention.

FIG. 1 is a schematical block diagram of a data duplexing system in an embodiment of the present invention. A primary side composite storage unit system has a plurality ("M" units; 1 to m) of primary side control units 210, 220, 230 and 240. Each of the primary side control units is connected with a processing unit 10 respectively. A secondary side composite storage unit system has a plurality ("N" units; 1 to n) of secondary side control units 310, 320, 330 and 340. An interface cable 40 is used to connect the processing unit with the primary side control units and to connect the primary side control units with the secondary side control units. A ring-like connection is provided by a communication cable 50 between the secondary side control units, and the secondary side control units can communicate with each other. Here, different names are used for the interface cable 40 and the communication cable 50, while any type of cable may be used so far as it can communicate information. To increase the reliability, redundant interface cable 40 or redundant communication cable 50 may be used.

When the processing unit issues a write request, the primary side control unit receiving the write request issues a write request to the secondary side control unit for the purpose of duplexing the data containing the write request to the secondary side control unit connected with the primary side control unit via the interface cable. When the data of the write requests are transferred via the interface cable 40 from the primary side control unit to the secondary side control unit, the sequence to receive the data of the write requests to be received by the secondary side control unit is not necessary consistent with the sequence of the issuance of the write requests to the primary side control unit by the host, and the sequence may be different. For this reason, it is necessary at the secondary side control unit to re-align the requests in correct sequence (the sequence, in which the write requests have been issued). For this purpose, the primary side control unit puts sequential numbers to the write requests in the order of receiving of the write requests from the host, and the sequential numbers are sent when the data of the write requests are transferred to the secondary side control unit. By referring to the sequential numbers, the secondary side control unit can identify the sequence of the issuance of the write requests by the host.

In the above, description has been given on the means when the plural secondary side control units are connected by a ring-like connection using the communication cable as the means of communication between the secondary side control units in the secondary side composite storage unit system, while the communication between the secondary side control units may be carried out using communication means such as infrared or radio communication, or the secondary side control units may be connected by bus connection, and communication may be performed using the bus. Regardless of which of communication protocols (communication means) is used, the duplexing of the data can be carried out by a method similar to the method described in the embodiment as described below (by transferring an information of the same type as in the present embodiment).

Next, detailed description will be given on an arrangement of the control units.

Figure 14:
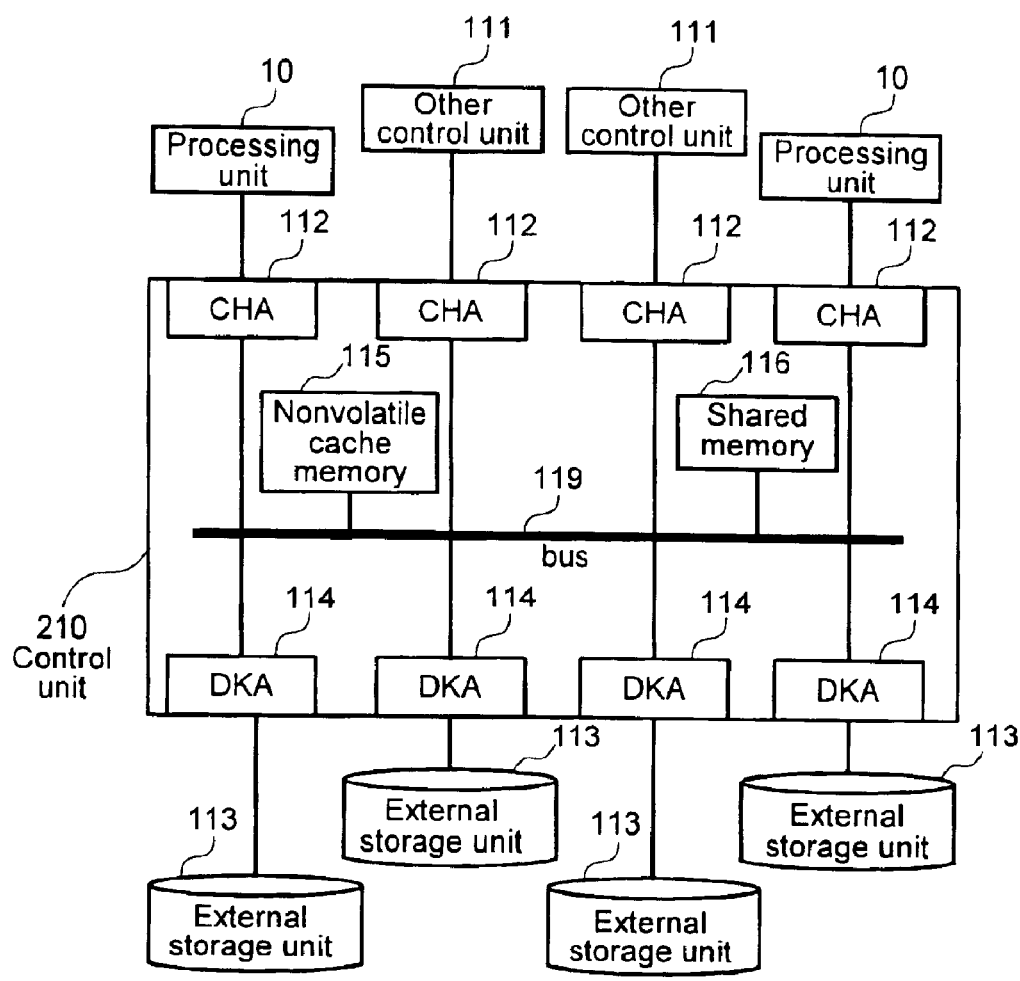
FIG. 14 is a block diagram of the control unit.

FIG. 14 is a block diagram of a primary side control unit 210. Regardless of whether it is a primary side control unit or a secondary side control unit, the control unit in the present embodiment has the same arrangement as that of the control unit 210. The control units has a microcomputer-controlled channel adaptor 112, which delivers and receives data or control information to and from a processing unit 10, delivers and receives data and control information to and from the other control unit 111 (delivers and receives data and control information between the primary and the secondary side control units), and delivers and receives data and control information between plural secondary side control units in the secondary side composite storage unit system. Further, the control unit has a microcomputer-controlled disk adaptor 114, which delivers and receives data to and from an external storage unit 113 such as a disk drive, a nonvolatile cache memory 115 for storing the received data, a shared memory 116 for storing shared information of the control unit, and a bus 119 for transferring data and control information between the channel adaptor, the disk adaptor, the nonvolatile memory, and the shared memory within the control unit. Here, in case where the unit shown in FIG. 14 is a primary side control unit, the other control unit 111 corresponds to the secondary side control unit, and delivery and receiving of data are performed between the primary and the secondary side control units, and communication is performed between the primary and secondary side control units. Where the unit shown in FIG. 14 is a secondary side control unit, the other control unit may correspond to the other secondary side control unit within the secondary side composite storage unit system in addition to the primary side control unit. The control unit 210 and the external storage unit 113 make up together a storage system. This storage system is an external storage unit when seen from the processing unit 10. Where the processing unit is a main frame type computer, the external storage unit is called a subsystem.

Figure 15:
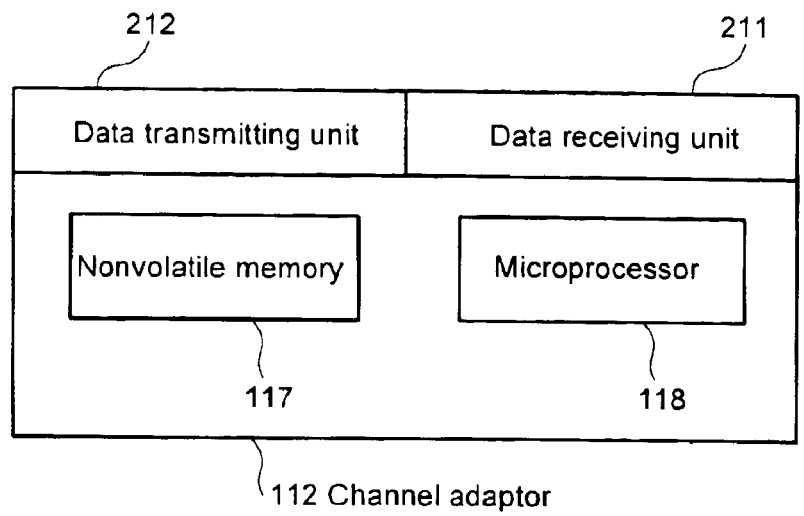
FIG. 15 is a block diagram of a channel adaptor.

FIG. 15 is a block diagram showing the details of the channel adaptor 112 shown in FIG. 14. The channel adaptor 112 has a data receiving unit 211 for receiving data from the processing unit 10 and the other control unit 111, a data transmitting unit 212 for transmitting data to the processing unit 10 and the other control unit 111, a nonvolatile memory 117 for storing programs including programs for executing the present invention, and a microprocessor 118 for executing the programs.

Next, referring to FIG. 2 and FIG. 3, description will be given on operation of the primary side control unit when the host computer issues the write request, and also on operation of the primary and the secondary side control units when the write requests are issued from the primary side control unit to the secondary side control unit.

Figure 2:
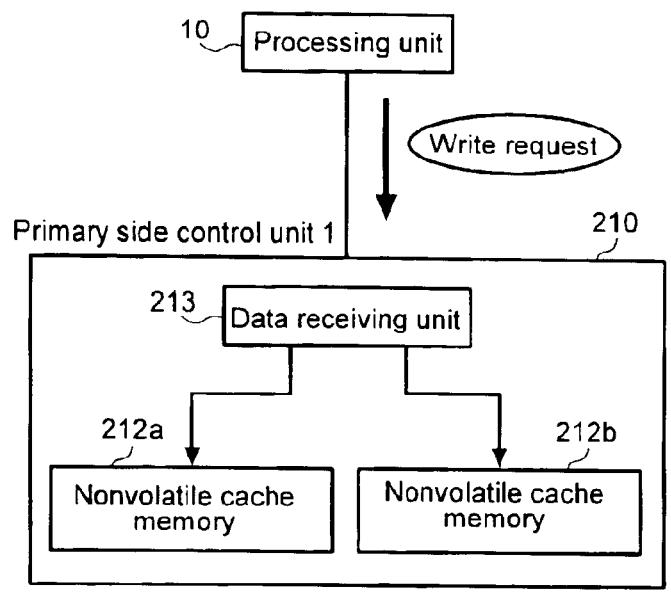
FIG. 2 shows a flow of processing of primary side control units to a write request from a processing unit.

FIG. 2 shows a processing when the write requests from the processing unit 10 are received at the primary side control unit 1 (210). A data receiving unit 213 (the data receiving unit 211 in FIG. 15) of the primary side control unit 1 (210) receives a write request from the processing unit 10, and time information is added to the write data. This is stored in redundant primary side nonvolatile cache memories 212a and 212b (the nonvolatile cache memory 115 in FIG. 14), and a report on the completion of write requests is given to the processing unit 10. Where the processing unit has a timer and issues a write request, which is added with the time information obtained from the timer, the time information added to the write request can be used as the time information. On the other hand, in case where the processing unit has no timer, the time of receiving of the write request is obtained from the timer owned by plural primary side control units, and the time information thus obtained is used. As described above, the control unit also stores the sequential numbers according to the sequence of the issuance by the processing unit, i.e. in the receiving sequence of the write requests by the primary side processing unit.

Figure 3:
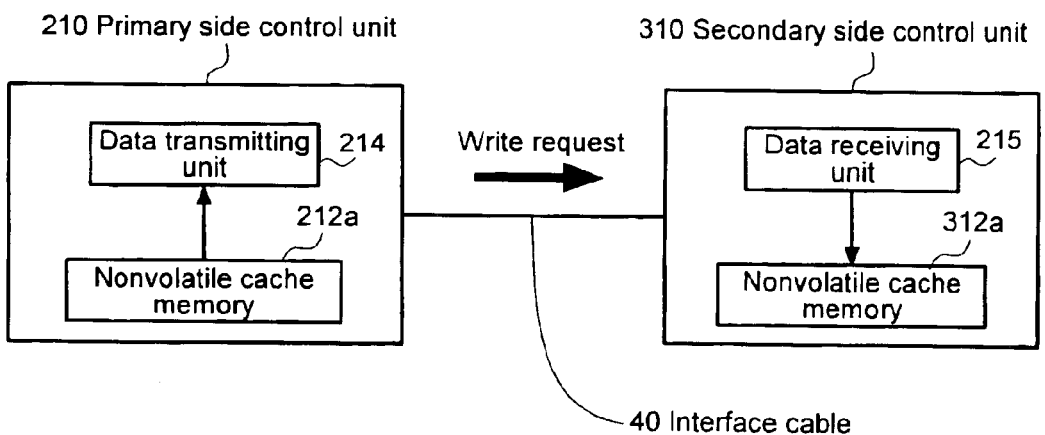
FIG. 3 shows a flow of processing of secondary side control units to a write request from the primary side control units.

FIG. 3 shows a process in case where a write request is issued from the primary side control unit 1 (210) to a secondary side control unit 1 (310). A data transmitting unit 214 (the data transmitting unit 212 in FIG. 15) of the primary side control unit 1 (210) issues a write request to the secondary side control unit 1 connected by the interface cable 40, and the write data, the time information, and the sequential numbers stored in the primary side nonvolatile cache memory 212a are transferred. The data receiving unit 215 (the data receiving unit 211 in FIG. 15) of the secondary side control unit 1 (310) stores the received write data, the time information (a write time from the processing unit to the primary side; The "time information" given below is the write time from the processing unit to the primary side in all cases), and the sequential numbers to the secondary side nonvolatile cache memory 312a (the nonvolatile cache memory 115 shown in FIG. 14). Also, between the other primary side control units "2–m" and between the secondary side control units "2–n", the write request is issued from the primary side control unit to the secondary side control unit in similar manner when the write request is received from the processing unit.

Figure 4:
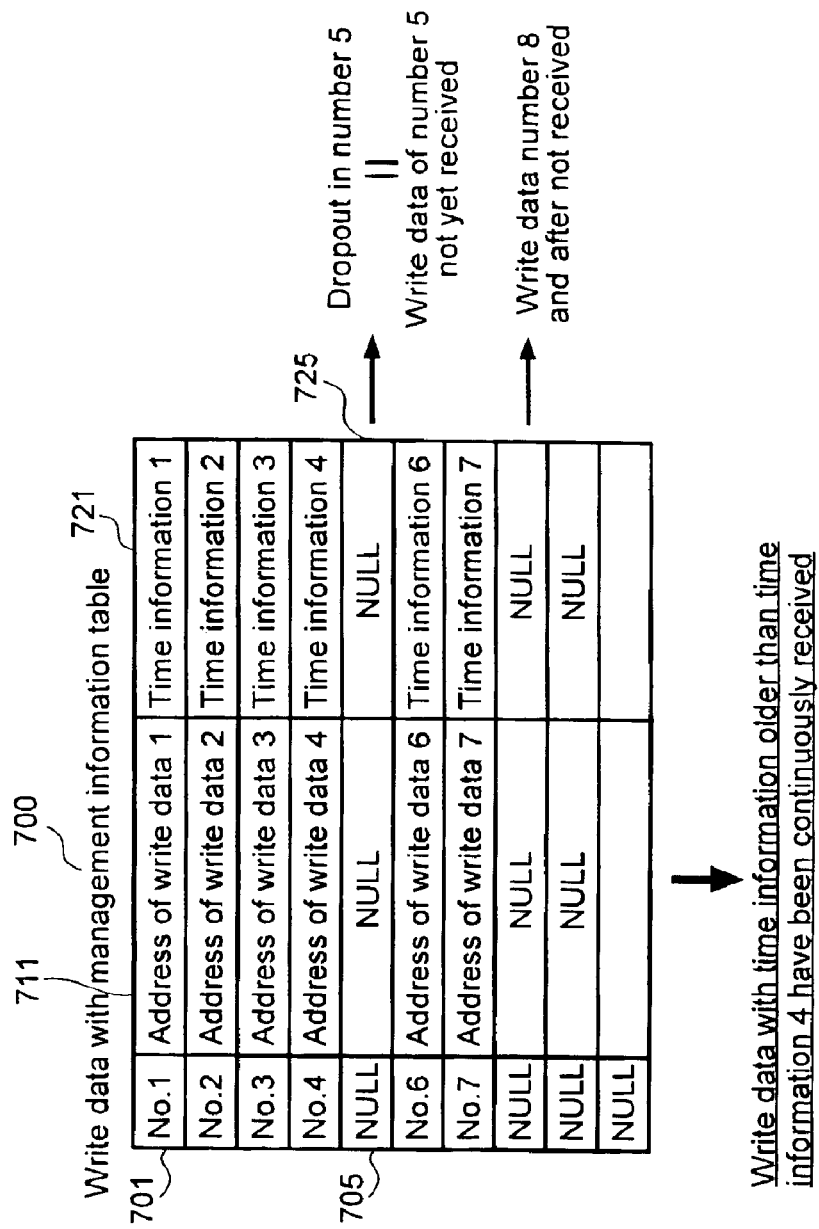
FIG. 4 represents an arrangement example of a write data management information table provided on the secondary side control units.

FIG. 4 shows configuration of a write data management information table 700 provided on a secondary side nonvolatile cache memory 312a (nonvolatile cache memory 115 in FIG. 14) of the secondary side control unit 1 (310). The secondary side control unit 1 manages the write data received from the primary side control unit 1 (210) according to the write data management information table 700 provided on the secondary side nonvolatile cache memory 312a. In the write data management information table, a sequential number 701, a time information 721 of the write data, an address information 711 of the secondary side nonvolatile cache memory 312a (nonvolatile cache memory 115 in FIG. 14), etc. are stored. The secondary side control unit 310 receives the data sent from the primary side control unit 210 not necessarily in the sequence from the older time information, and there may be temporarily some dropout in the write data. For this reason, the secondary side control unit refers to the sequential number 701 stored in the write data management information table, checks whether there is a dropout or not in the number and finds out the newest write request, which has been continuously received and has no dropout in the sequence number. The secondary side control unit judges that the write requests have been received up to the time given by the time information of this write request. Specifically, by referring to the write data management information table 700, the secondary side control unit 310 can check by which time the write requests have been continuously received, and after which time the write data has dropout. In an example shown in Table 700, there is a dropout in the sequential number 705, and it is evident that a write data having the sequential number No. 5 is not received yet, and that the secondary side control unit has received all of the write requests of the time information 4 and prior to it.

Each of the secondary side control units in the secondary side composite storage unit system has this write data management information table and manages the received write data and the time information of the data. Where the plural primary side control units are connected with a secondary side control unit, the secondary side control unit has as many write data management information tables for primary side control units as connected.

Next, description will be given on a method to guarantee the duplexing of the received write data by explaining operation to determine guarantee time and operation to notify guarantee time by the secondary side control unit, which has received the write data from the primary side control unit.

Figure 16:
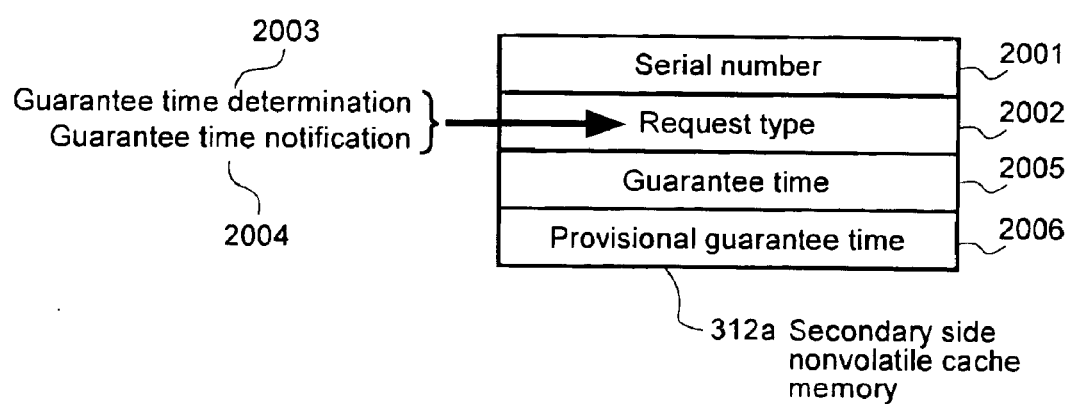
FIG. 16 shows information to be used in the process to determine the guarantee time and the process to notify the guarantee time.

First, referring to FIG. 16, description will be given on information to be circulated between the secondary side control units for the purpose of carrying out the process to determine guarantee time and the process to notify guarantee time. FIG. 16 shows information to be circulated between the secondary side control units, and it is stored on a secondary side nonvolatile cache memory within the control unit. The details and the use of each information will be described later. Serial number 2001 is a specific information of a control unit for identifying the control unit. It is stored on the secondary side nonvolatile cache memory 312a and it is also stored in a shared memory 116 of each control unit. In a request type 2002, there are two types: "request type 1=guarantee time determination" 2003 and "request type 2=guarantee time notification" 2004. This is the information, which is used for judging "whether the process to determine guarantee time should be carried out" or "whether the process to notify guarantee time should be carried out" by the secondary side control unit, which has received the request type 2002. A guarantee time 2005 is a time, which guarantees that all of the write data having the time information older than the guarantee time have been received at the secondary side control unit. A provisional guarantee time 2006 is a guarantee time provisionally used until a formal guarantee time 2005 is determined in the process to determine the guarantee time (the details are to be described later). All of the information are stored on the secondary side nonvolatile cache memory 312a.

(1) Process to Determine Guarantee Time

Figure 6:
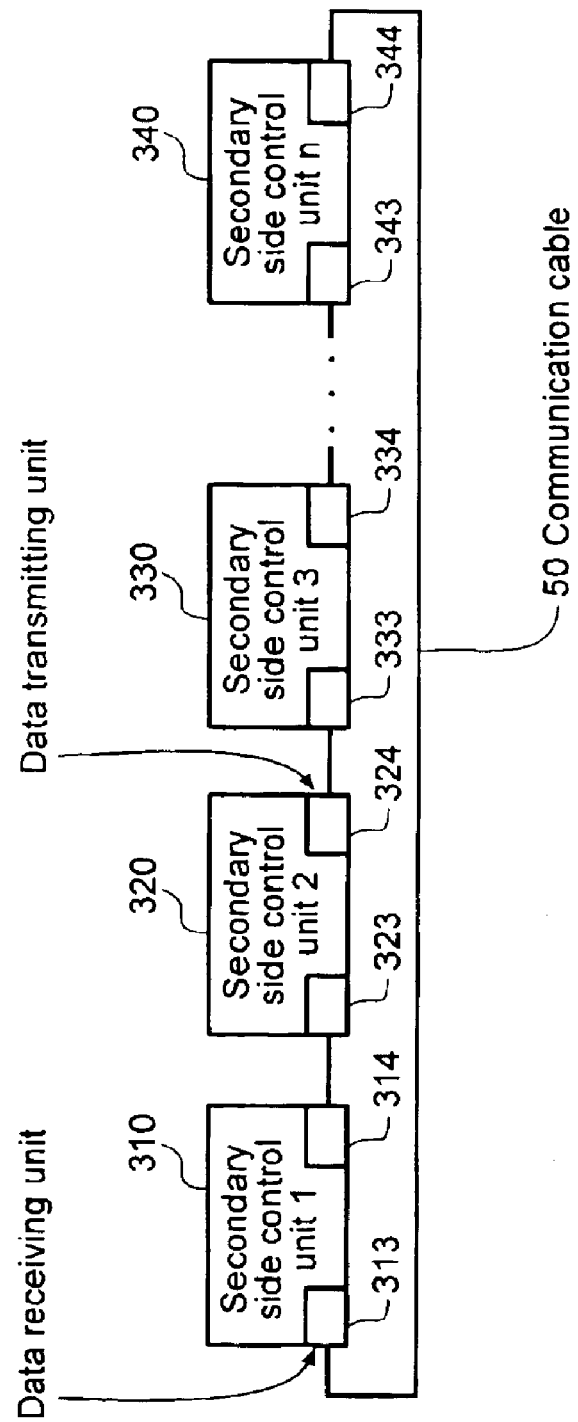
FIG. 6 shows connection of the plural secondary side control units connected via a communication cable according to the present embodiment.

Description will be given now on a process at each of the secondary side control units when a guarantee time for guaranteeing the duplexing of the write data received from the primary side control units is determined. In explaining this process, an example is taken on a secondary side composite storage unit system shown in FIG. 6. Here, in the system shown in FIG. 6, "n" (number) secondary side control units (310, 320, 330 and 340) having data receiving units (313, 323, 333 and 343) and data transmitting units (314, 324, 334 and 344) are connected with each other by a ring-like connection using a communication cable 50. The data receiving unit 211 corresponds to the data receiving units (313, 323, 333 and 343), and the data transmitting unit 212 corresponds to the data transmitting units (314, 324, 334 and 344).

Now, reference time will be described. To guarantee the duplexing of the write data, the secondary side control unit 1 (310) refers to the write data management information table 700 of the secondary side control unit 1. It is confirmed, using the sequential numbers, up to which time there has been no dropout of the write data and the write data have arrived continuously from the primary side control unit. Then, the time added to the write data continuously received is stored in the secondary side nonvolatile cache memory as "reference time". The reference time thus determined might be well defined as the time, at which it is possible to guarantee that all of the write data, which have been transmitted from the primary side control unit connected to the secondary side control unit and which have time information older than the reference time, have been received at the secondary side control unit. Each of the secondary side control units has the write data management information table 700. The reference time is determined for each of the secondary side control units and it is stored in the secondary side nonvolatile cache memory of each of the secondary side control units.

In the following, description will be given on the process to determine guarantee time.

First, description will be given on operation of the secondary side control unit, which transmits information to determine the guarantee time. The secondary side control unit 1 (310) transfers the following data from the transmitting unit 314 to the secondary side control unit 2 (320) for communication between the secondary side control units, to which it is connected: Its own serial number stored on the shared memory 116 (information specific to each control unit), request type=guarantee time determination (request type to be transmitted is set to the type called guarantee time determination), and provisional guarantee time (reference time stored by itself) 2006 (transmission from the data transmitting unit 314 of FIG. 6 to the data receiving unit 323). In the request type, an information is stored, which contains data as to for what on the purpose the transmission of the secondary side control unit 1 (310) on the transmitting side is performed. The secondary side control unit 2 (320) on receiving side can judge which kind of process should be taken by referring to the request type.

Figure 5:
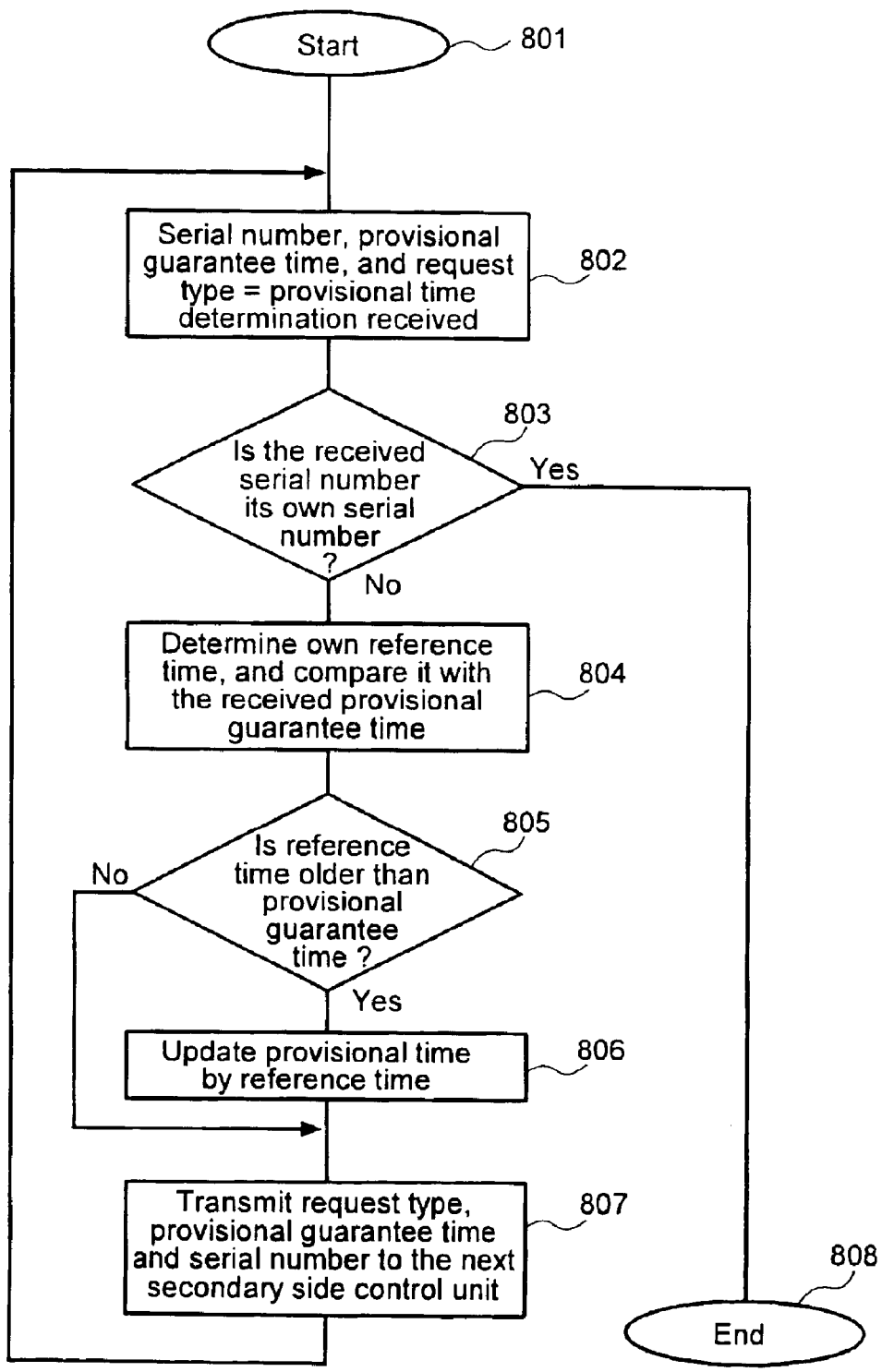
FIG. 5 is a flowchart of guarantee time determining process at the secondary side control units.

Next, referring to FIG. 5, description will be given on operation of the secondary side control unit, which sequentially receives the information transmitted by the secondary side control unit. When the secondary side control unit 2 (320) receives the information "request type 1=guarantee time determination" at the data receiving unit (323) from the secondary side control unit 1 (Step 802), the received serial number is compared with its own serial number stored in the shared memory, and it is checked whether the received serial number is different from its own serial number or not (Step 803). If it is different, the secondary side control unit 2 (320) determines its own reference time (Step 804), and this is compared with the provisional guarantee time 2006 received from the secondary side control unit 1 (310) of the preceding stage (Step 805). After the comparison, if its own reference time is older than the received provisional guarantee time 2006, the secondary side control unit 2 (320) updates the provisional guarantee time 2006 by its own reference time (Step 806). Then, the secondary side control unit 2 transmits the following data to the next secondary side control unit 3 (330) in Step 801: Serial number 2001 of the secondary side control unit (310) received from the secondary side control unit 1 (310) in Step 801, and the provisional guarantee time updated in Step 806 together with "request type 1=guarantee time determination" 2003 (Step 807). On the contrary, as the result of the comparison in Step 805, if the received provisional guarantee time 2006 is older, the received provisional guarantee time 2006 is not updated, and the provisional guarantee time received in Step 802 is transmitted, together with serial number 2001 of the secondary side control unit 1 (310) and "request type 1=guarantee time determination" 2003, to the next secondary side control unit 3 (330) (Step 807).

The above process is repeated between all of the secondary side control units. Then, in Step 807, the provisional guarantee time 2006, the serial number 2001 of the secondary side control unit 1 (310), and "the request type 1=guarantee time determination" 2003 are transmitted from the data transmitting unit (343) of the secondary side control unit "n" (340) to the data receiving unit (314) of the secondary side control unit 1 (310). In Step 802, the secondary side control unit 1 (310) confirms the serial number 2001 received from the secondary side control unit "n" (430) and confirms that it is the same as its own serial number in Step 803. As a result, it is recognized that the received provisional guarantee time 2006 has been determined after it has been circulated to all of the secondary side control units, and the provisional guarantee time 2006 is determined as the guarantee time 2005. Then, the secondary side control unit 1 stores the guarantee time in its own nonvolatile cache memory (312a).

The guarantee time 2005 thus determined is the time, which can guarantee that all of the write data having older time and being transmitted from all of the primary side control units have been received by the secondary side control units.

In a case where plural primary side control units are connected to a single secondary side control unit, the reference time of each of the secondary side control units is determined as follows: The other process to determine the guarantee time is carried out exactly in the same manner as above. The secondary side control unit has as many write data management information tables 700 as matching the connected primary side control units. By referring to the write data management information table 700 corresponding to each of the primary side control units, it is possible to confirm by which time the write data have had no dropout and have arrived continuously from each of the primary side control units. When this time is defined as the provisional reference time, the secondary side control unit stores the provisional reference time having the oldest time among the corresponding provisional reference time as the reference time in the secondary side nonvolatile cache memory. The reference time determined in this manner is the time, which can guarantee that all of the write data transmitted from plural primary side control units connected to the secondary side control units and having the time information older than that have been received at the secondary side control units.

(2) Process to Notify the Guarantee Time

In the above, description has been given on the process to determine the guarantee time and it has been explained that the guarantee time 2005 indicates that duplexing of all write data having time information older than the guarantee time is guaranteed. However, each of the secondary side control units does not have the guarantee time 2005, and it is not possible to judge up to which write data having the time information the duplexing of the write data is guaranteed. The determined guarantee time 2005 is notified to all of the secondary side control units, and it is identified to which time the duplexing of the write data can be guaranteed by the secondary side control unit. Then, each secondary side control unit can guarantee the duplexing of the write data having the time information older than the guarantee time 2005.

First, the secondary side control unit 1 (310), which has determined the guarantee time and has stored the guarantee time in the nonvolatile cache memory, updates the request type 2002 among the information circulated between the secondary side control units to "the request type=guarantee time notification" 2004 (the request of transmission turned to the type "guarantee time notification"). Then, the request type (guarantee time notification) is transmitted to the secondary side control unit 2 (320) together with the determined guarantee time 2005 and its own serial number 2001.

Figure 7:
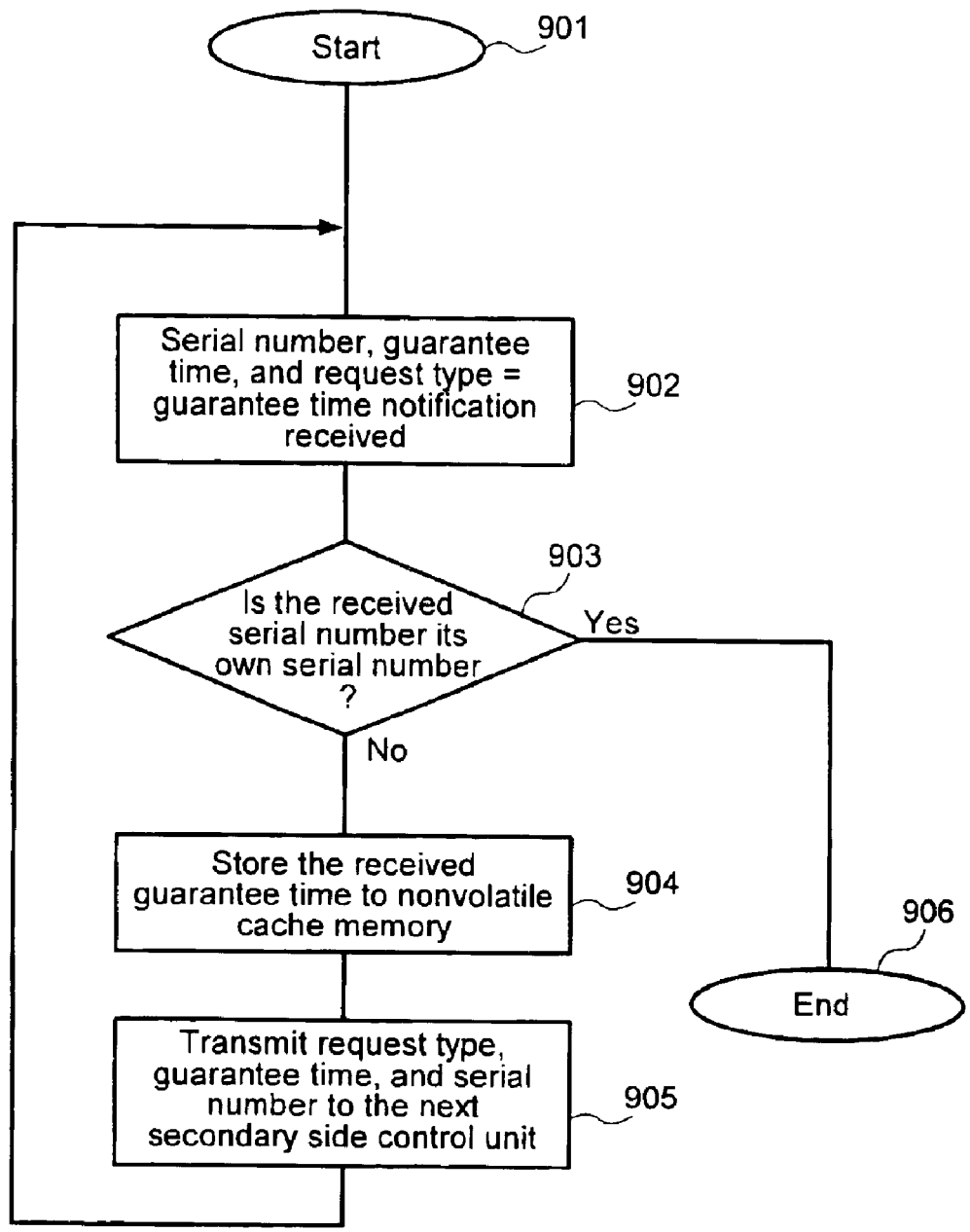
FIG. 7 is a flowchart of processing to notify guarantee time in the secondary side control units.

Next, referring to FIG. 7, description will be given on operation of the secondary side control unit, which has received circulatory information having the guarantee time notification as the request type. In Step 902, the secondary side control unit 2 (320), which has received "request type=guarantee time notification" at the data receiving unit (323), judges whether the received serial number 2001 is different from its own serial number or not (Step 903). If it is different, the received guarantee time 2005 is stored in its own nonvolatile cache memory (Step 904). Then, the guarantee time 2005 received in Step 902 is transmitted to the secondary side control unit 3 (330) together with the request type 2=guarantee time notification 2004 and the serial number 2001 of the secondary side control unit 1 (310) (Step 905).

The above process is repeated between all of the secondary side control units along the communication cable 50 connected in a ring-like loop. Finally, in Step 901, the guarantee time 2005, the serial number 2001 of the secondary side control unit 310, and the request type=guarantee time notification 2004 are transmitted from the data transmitting unit (344) of the secondary side control unit "n" (340) to the data receiving unit 313 of the secondary side control unit 1 (310) (Step 905). Then, the secondary side control unit (310) receives the serial number from the secondary side control unit "n" (340) in Step 902. In Step 903, it is confirmed that the received serial number 2001 is the same as its own serial number. Then, it is confirmed that the guarantee time notification has been circulated through the secondary side control units connected in the ring-like loop, and it is recognized that the guarantee time 2005 has been notified to all of the secondary side control units.

As explained in (1) and (2) above, by determining the guarantee time 2005 and by notifying it to all of the secondary side control units, each of the secondary side control units can judge whether the write data on its own secondary side nonvolatile cache memory is older than the guarantee time 2005 or not, and the duplexing of the write data having the time information older than the guarantee time 2005 is guaranteed.

(3) Process to Carry out the Determination of Guarantee Time and Notification of the Guarantee Time at the Same Time Next, description will be given on a process at each of the secondary side control units in case where the notification of guarantee time and the determination of the guarantee time for the next time are simultaneously carried out. By simultaneously carrying out the determination of the guarantee time of the next time and the notification of guarantee time, it is possible to improve the efficiency of the process. In the conventional procedure, it has been necessary to have communication twice between the master control system and each of the secondary side control units, (i.e. communication for determination of guarantee time and communication for notification of guarantee time) for the purpose of guaranteeing the duplexing of data. On the other hand, according to the procedure of the present invention, the communication for determination of the guarantee time and communication for notification of guarantee time are carried out together (at the same time), and it is possible to guarantee the duplexing of the data simply by one communication between the secondary side control units.

First, the secondary side control unit 1 (310) determines the guarantee time 2006 received from the secondary side control unit "n" (340) as the guarantee time 2005, and it is stored in its own nonvolatile cache memory 312a. Then, the guarantee time 2005 is transferred to the secondary side control unit 2 (320) together with the request type 2=guarantee time notification 2004. Further, the secondary side control unit 1 (310) transmits the following data to the secondary side control unit 2 (320) connected via the transmitting unit 314 between the secondary side control unit: the provisional guarantee time 2006, which is its own current reference time for determination of the next guarantee time, its own serial number 2001, and the request type 1=guarantee time determination 2003. Specifically, the serial number of own control unit, the request type 1 (guarantee time determination), the provisional guarantee time, the request type 2 (guarantee time notification), and the guarantee time are transferred together to the next secondary side control unit.

Figure 8:
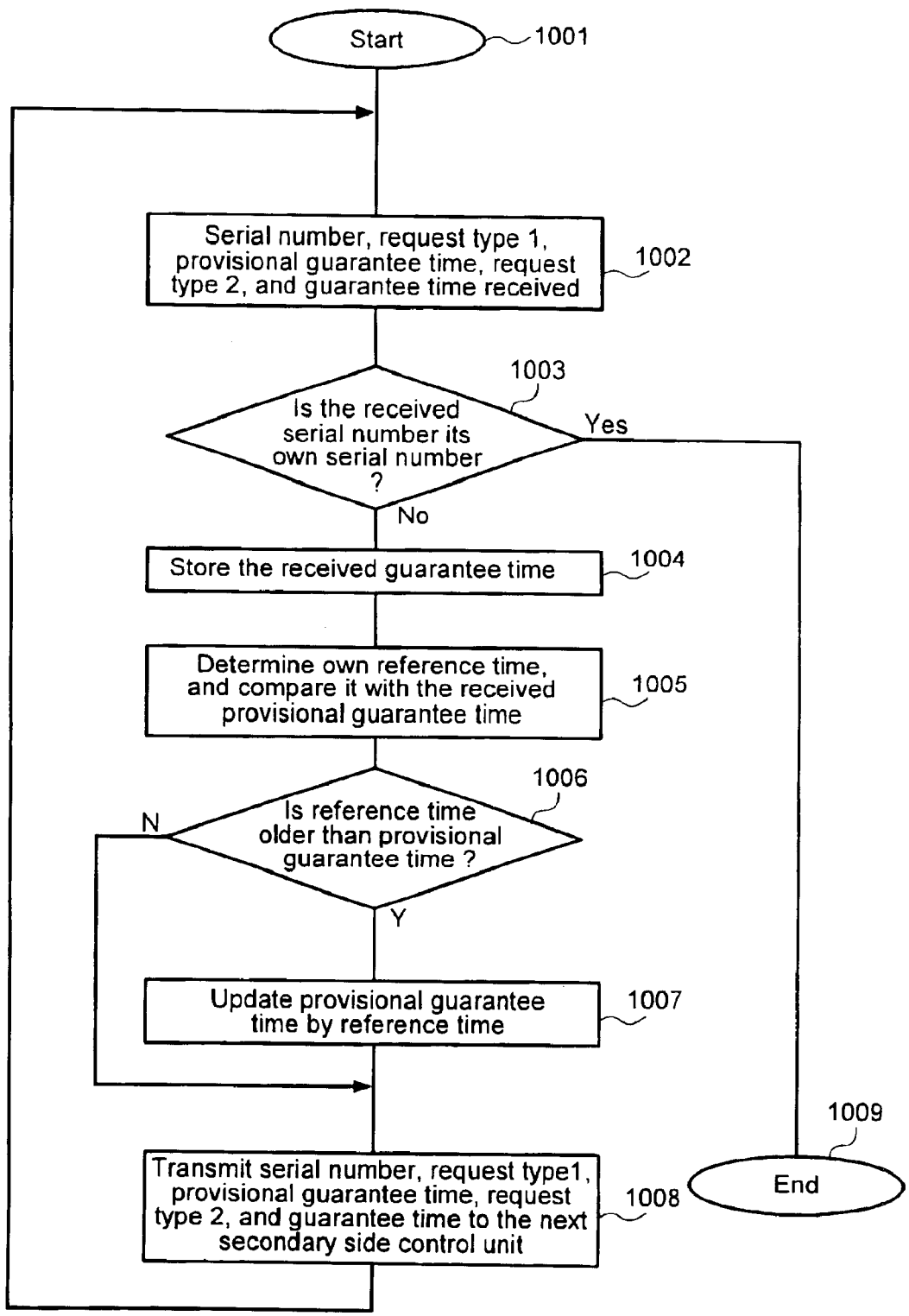
FIG. 8 is a flowchart of processing having a process to determine the guarantee time and a process to notify the guarantee time in the secondary side control units.

Next, referring to FIG. 8, description will be given on operation of the secondary side control unit, which receives requests on the guarantee time notification and the guarantee time determination as a single process. When the secondary side control unit 2 (320) receives the request type 1=guarantee time determination 2003, and the request type 2=guarantee time notification 2004 together at the data receiving unit (323) (Step 1002), it is confirmed that the received serial number is different from its own serial number (Step 1003). Then, the received guarantee time 2005 is stored in its own nonvolatile cache memory (Step 1004). Further, the secondary side control unit 2 determines its own reference time and compares this with the provisional guarantee time 2006 received from the secondary side control unit 1 (310) (Step 1005). As the result of the comparison, if the reference time of the secondary side control unit 2 is older than the provisional guarantee time 2006, the provisional guarantee time 2006 is updated by its own reference time in Step 1007, and it is advanced to Step 1001. If it is not older, the received provisional guarantee time is maintained intact, and the provisional guarantee time is not updated, and it is advanced to Step 1008. In the next Step 1008, the serial number 2002 of the secondary side control unit 1 (310) received from the secondary side control unit 1 (310), and the request type 1=guarantee time determination 2003 are transmitted together with the provisional guarantee time to the secondary side control unit 3 (330), and the request type 2=guarantee time notification 2004 and the guarantee time 2005 are transmitted to the secondary side control unit 3 (330) of the next stage.

The above procedure is repeated between all of the secondary side control units. In Step 1002, the following data are finally transmitted from the data transmitting unit (343) of the secondary side control unit "n" (340) to the data receiving unit (314) of the secondary side control unit 1 (310): Serial number 2001 of the secondary side control unit 1 (310), request type 1=guarantee time determination 2003, provisional guarantee time 2006, request type 2=guarantee time notification 2004, and guarantee time 2005. The secondary side control unit 1 (310) receives the serial number 2001 from the secondary side control unit "n" (340) (Step 1002). By confirming that the received serial number is identical with the serial number 2001 (Step 1003), it is recognized that the guarantee time 2005 has been notified to all of the secondary side control units. Further, it is recognized that the received guarantee time 2006 has been determined after it has been circulated to all secondary side control units, and the provisional guarantee time 2006 is determined as a guarantee time for the next stage.

As described above, by carrying out the process to determine guarantee time and the process to notify guarantee time at the same time, it is possible to reduce the number of communications to one between the secondary side control units necessary for guaranteeing the duplexing of the write data.

Figure 9:
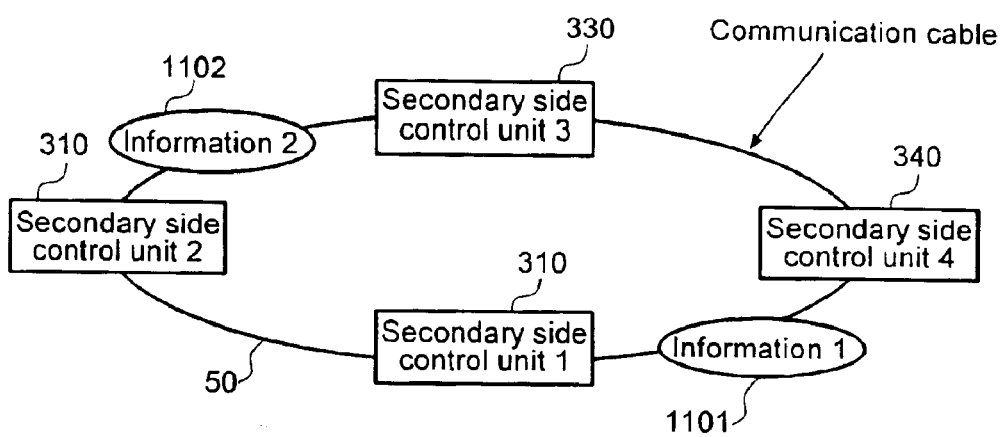
FIG. 9 is a drawing to explain a case where two of both the process to determine guarantee time and the process to notify guarantee time are carried out in parallel.
Figure 10:
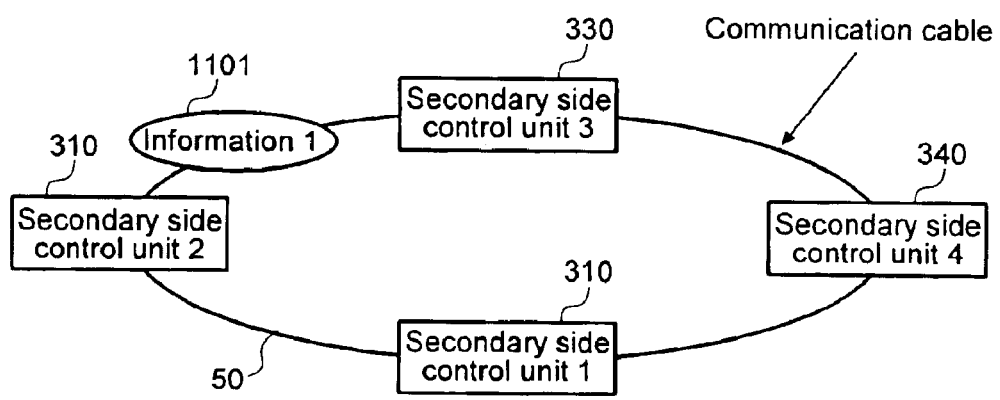
FIG. 10 is a drawing to explain a case where the process to determine the guarantee time and the process to notify the guarantee time are carried out together at the same time.

Next, description will be given on a case where two or more processes to determine guarantee time and to notify guarantee time are carried out in parallel (two processes shown in the example) between the secondary side control units connected via a ring-like connection. By executing two or more processes at the same time (in parallel), it is possible to reduce the execution interval of the processes for guaranteeing the duplexing of the write data. FIG. 9 and FIG. 10 explain this procedure. FIG. 9 is a conceptual drawing of a case where the process to determine guarantee time and the process to notify guarantee time are carried out together at the same time in parallel between the secondary side control units connected via a ring-like connection. FIG. 10 shows a comparative example to indicate superiority of the method shown in FIG. 9, and it is a conceptual drawing of a case where only one each of the process to determine guarantee time and the process to notify guarantee time are carried out.

In FIG. 9, an information 1 (1101) being circulated between the secondary side control units contains an information to carry out the process to determine guarantee time and the process to notify guarantee time together as explained in the process (3) given above. It has the serial number 2001, the request type 1=guarantee time determination 2003, the request type 2=guarantee time notification 2004, the guarantee time 2005, and the provisional guarantee time 2006. Also, an information 2 (1102) is also an information for determination of guarantee time and for notification of guarantee time and being circulated between the secondary side control units. (It is the same type of information as the information 1, but it has different content.) In FIG. 9, the information 1 (1101) and the information 2 (1102) are circulated in parallel between the secondary side control units (310, 320, 330, and 340) connected via a ring-like connection, and two of the process to determine guarantee time and the process to notify guarantee time are carried out in parallel. Because two types of information are circulated at the same time, the interval of the circulation of the information is shorter. Thus, the process to determine guarantee time and the process to notify guarantee time are carried out much more quickly.

In FIG. 10, only one information, i.e. the information 1, is circulated between the secondary side control units connected via a ring-like connection. Compared with the case where two types of information are circulated at the same time as shown in FIG. 9, the interval of the circulation of the information is longer, and the process to determine guarantee time and the process to notify guarantee time are carried out more slowly.

Now, it is assumed in FIG. 9 and FIG. 10 that an information is circulated between four secondary side control units connected via a ring-like connection and that the time until the duplexing of the write data (having time information older than the guarantee time) is guaranteed is an interval T (1201).

Figure 11:
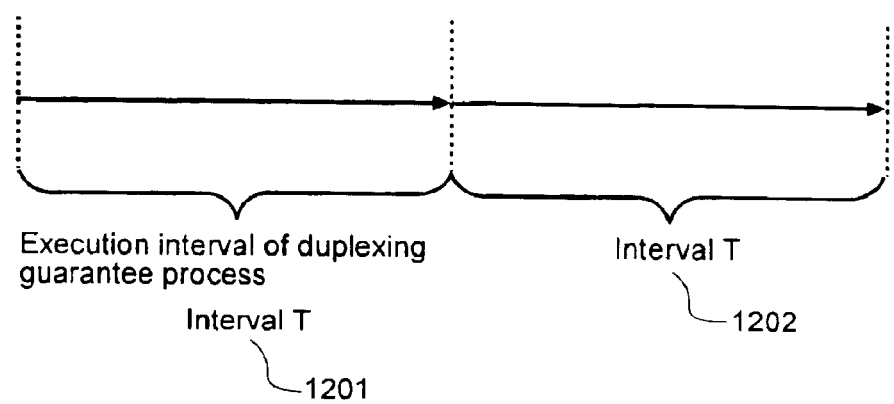
FIG. 11 shows execution interval of the processing when the processing having the process to determine the guarantee time and the process to notify the guarantee time is carried out together at the same time.
Figure 12:
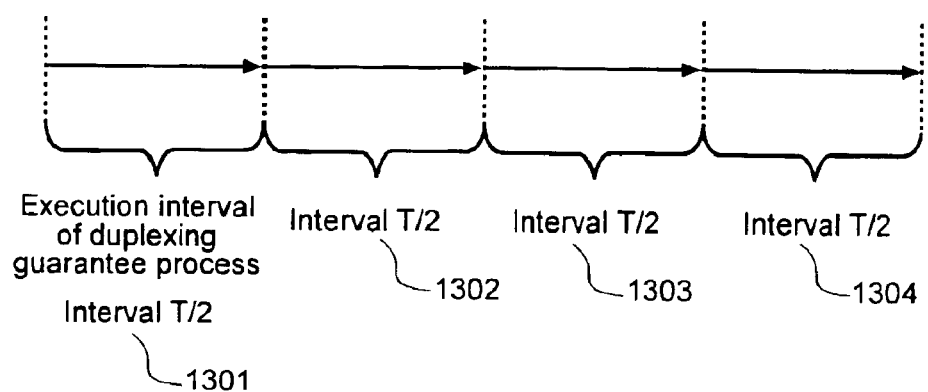
FIG. 12 shows execution interval of the processing when the processing having the process to determine the guarantee time and the process to notify the guarantee time is carried out together with two processes in parallel.

In this case, in the example shown in FIG. 10, the process to guarantee the duplexing of the write data is guaranteed by repeating the circulation of one information 1. Then, as shown in FIG. 11, the process to guarantee the duplexing of the write data is repeated at the interval T (1201, 1202, . . . ). From a different viewpoint, it is that the duplexing is guaranteed for the write data which is earlier or older than the current time by the interval T.

On the other hand, in the example shown in FIG. 9, the information 1 (1101) and the information 2 (1102) are circulated in parallel with an interval of T/2. This means that the information 1 is circulated between the secondary side control units, and after guaranteeing the duplexing of the write data having the time information older than the guarantee time, the information 2 is circulated between the secondary side control unit and the duplexing of the write data having time information older than the guarantee time is guaranteed. That is, when the circulation of the two types of information (the information 1 and the information 2) are repeated in the process to guarantee the duplexing of the write data, the process to guarantee the duplexing of the write data is repeated at an interval of T/2 (1301, 1302, 1303, 1304, . . . ). From a different viewpoint, it means that duplexing is guaranteed for the write data, which is earlier than the current time by the interval T/2.

As described above, compared with the case where the processes to carry out determination of guarantee time and notification of guarantee time are executed only once between the secondary side control units connected via the ring-like connection (the case shown in FIG. 10), the duplexing can be guaranteed up to the more recent write data when two or more processes to determine and to notify guarantee time are carried out together between the secondary side control units connected via the ring-like connection (two processes are shown in FIG. 9).

In the explanation, description has been given on the case where two processes to determine guarantee time and to notify guarantee time are carried out in parallel between the secondary side control units connected via the ring-like connection, while it is also possible to guarantee the duplexing to more recent write data by carrying out 3 or 4 processes in parallel at the same time. However, it should be noted in this case that two or more communications (i.e. communication of the information to carry out the determination of guarantee time and notification of guarantee time) must be carried out physically and at the same time on a communication cable of ring-like loop connecting the secondary side control units. Even in case where the secondary side control units are connected with each other logically via ring-like loop, if the information to carry out the processes to determine guarantee time and to notify guarantee time together cannot be transferred on the communication cable, it is difficult to shorten the guarantee interval T. For instance, when circulatory connection is executed logically via a bus, there is no secondary side control unit where the load is concentrated. But, the bus can transfer only one communication at one time, and two processes to perform determination of guarantee time and notification of guarantee time in parallel cannot be transmitted.

After the write data of the secondary side nonvolatile cache memory, for which duplexing is guaranteed, has been written to the external storage unit 113, it is permitted to abandon the data from the secondary side nonvolatile cache memory. For this reason, if the duplexing of the write data is more quickly guaranteed, the write data can be quickly written to the external storage unit, and the write data can be more quickly abandoned from the nonvolatile cache memory. This makes it possible to reduce the rate of use of the cache memory, and to increase operation performance as a system. Specifically, by carrying out two or more processes to determine guarantee time and to notify guarantee time in parallel, the time up to the guarantee of the duplexing of data can be shortened, and this makes it possible to reduce the rate of use of the secondary side nonvolatile cache memory associated with the duplexing of the data. Even in case where trouble occurs in the secondary side system by any chance, it is possible to reduce the amount of data to be lost (the amount of data, for which duplexing cannot be guaranteed).

Figure 13:
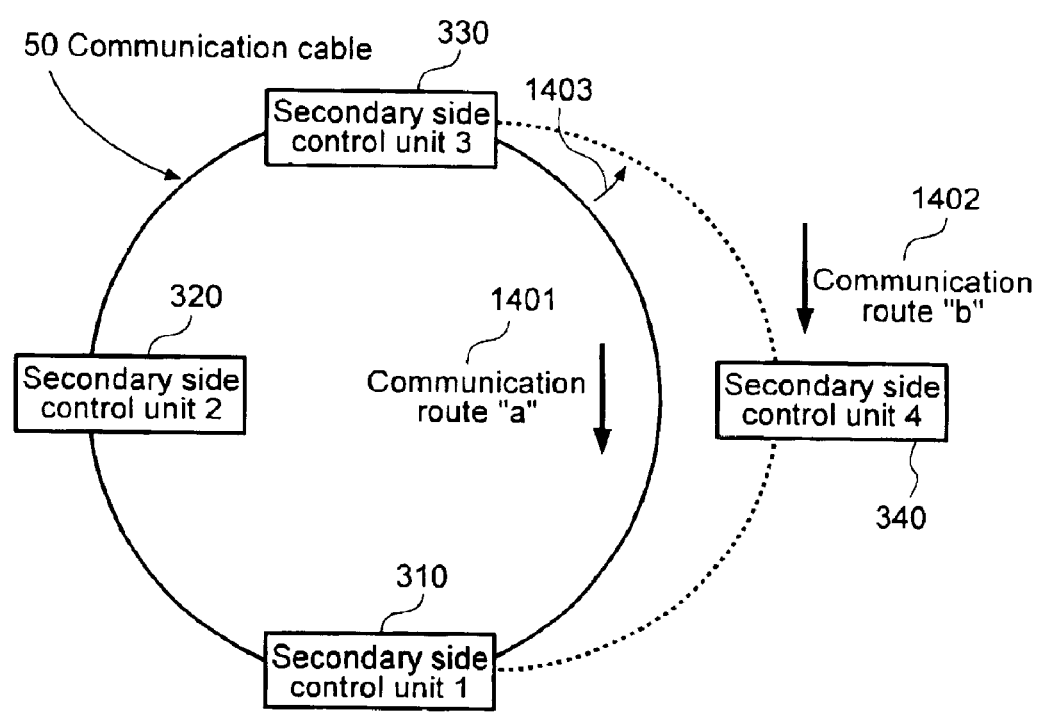
FIG. 13 is a drawing to explain a case where the secondary side control unit is additionally installed to a secondary side system.

FIG. 13 shows a case where an additional secondary side control unit 4 (340) is added on on-line basis to the secondary side system, which has secondary side control units (310, 320 and 330) connected via a ring-like connection. First, in addition to an existing communication route "a" (1401) (shown by solid line), a communication route "b" (1402) (shown by dotted line) with a secondary side control unit 4 (340) added is built up using a communication cable 50. Then, the data transmitting unit of the secondary side control unit 3 (330) is provided with the function to transmit information by selectively designating a control unit among the secondary side control unit 1 (310) and the secondary side control unit 4 (340) connected via the communication cable 50. Then, by a command, the destination of information transmission of the secondary side control unit 3 is switched over from the secondary side control unit 1 (310) to the secondary side control unit 4 (340). As a result, it is possible to additionally install the secondary side control unit on on-line basis.

As described above, in the storage unit system according to the embodiment of the present invention, it is possible to obtain the following features and functions:

In the present embodiment, all of the secondary side control units ("N" in number) are connected by a communication route such as communication cable, and each of the secondary side control units carries out communication with the control unit connected with it. Thus, information can be circulated between all of the secondary side control units. Each of the secondary side control units determines guarantee time by circulating time information added to the write data received from the primary side control unit along the communication route between all of the secondary side control units. Then, the information related to the determined guarantee time is notified by circulating to all of the secondary side control units along the communication route, and the duplexing of the data can be guaranteed. In the embodiment, a communication cable in a ring-like loop is used as the communication route for circulating the information, while communication means such as infrared or radio communication may be used so far as the information can be circulated between the secondary side control units. Also, the secondary side control unit may be connected to a bus, and information may be circulated by communication between the secondary side control units using the bus.

In the storage unit system as described above, the process and the communication to guarantee the duplexing of the data are shared by each of the secondary side control units, and this prevents the concentration of the process and the communication on a single secondary side control unit.

Also, in the present system, it does not matter how many secondary side control units there are. It will suffice if each secondary side control unit is provided with the function to communicate with the two control units, i.e. the control units serving as a communication source and a communication destination of the information.

Each of the secondary side control units can transmit and receive the time information (time information to determine guarantee time of the next time) and the information relating to the determined guarantee time at the same time. As a result, it is possible to reduce the number of communications to one between the secondary side control units in the process to guarantee the duplexing of the data.

When an additional secondary side control unit "c" is installed between the two secondary side control units "a" and "b" connected via a communication route, a communication route is built up in advance by connecting the additional secondary side control unit "c" with the two secondary side control units "a" and "b". By switching over the communication destination of the secondary side control unit "a" from the secondary side control unit "b" to the secondary side control unit "c" (Step 1403), it is possible to additionally install the control unit on on-line basis.

When dual writing of the data is performed between plural primary side and secondary side control units ("M" vs. "N"), according to the conventional method, it is necessary to have two times of communication, i.e. two times each for determination and notification of guarantee time between the primary side control unit and other secondary side control units for the purpose of guaranteeing the duplexing of the data. According to the present embodiment, it is possible to carry out determination and notification of guarantee time by a single communication between the secondary side control units at the same time. This contributes to the increase of efficiency in the process of the duplexing of the data. Even in case there are many primary side and secondary side control units, it is possible to carry out the duplexing of the data without concentrating the load on a single secondary side control unit.

The present invention is not limited to the embodiments and various changes and modifications can be made within the spirit and scope of the present invention. Therefore, to appraise the public of the scope of the present invention, the following claims are made.

What is claimed is:

1. A storage system, comprising:
a plurality of storage units configured to store data;
a first control unit configured to control data written by a second control unit, the first control unit including:
a channel adaptor configured to receive data written by the second control unit;
a disk adaptor configured to transfer data to the plurality of storage units and receive data from the plurality of storage units; and
a memory configured to store data and/or information received from the channel adaptor and the disk adaptor; and
a communication cable that connects the first control unit and a third control unit,
wherein the first control unit is configured to communicate management information with the third control unit via the communication cable, and wherein based on the management information the first control unit and the third control unit are configured to determine common management information that describes a relationship between a plurality of data stored in the first control unit and in the third control unit, and to store data, which is selected based on the common management information, and which is from said memory, in the plurality of storage units.

2. The storage system according to claim 1, wherein the management information includes a first guarantee time determined by the third control unit.

3. The storage system according to claim 2, wherein the common management information is based on a second guarantee time of the first control unit and the first guarantee time.

4. The storage system according to claim 3, wherein the first guarantee time is based on information for data stored in the third control unit.

5. The storage system according to claim 4, wherein the information for the data stored in the third control unit includes time information for data managed in the third control unit.

6. The storage system according to claim 5, wherein information for data stored in the first control unit includes time information for data managed in the first control unit, and wherein the first control unit is configured to determine the common management information based on the time information for the data managed in the first control unit and the time information for the data managed in the third control unit.

7. The storage system according to claim 4, wherein the second guarantee time is based on information for data stored in the first control unit transferred to the first control unit from the second control unit.

8. The storage system according to claim 7, wherein the information for the data stored in the first control unit includes time information for data managed in the first control unit.

9. The storage system according to claim 1, further comprising a second communication cable that connects the first control unit and a fourth control unit, wherein the first control unit is configured to deliver the common management information to the fourth control unit via the second communication cable.

10. The storage system according to claim 9, wherein the common management information is used to determine another common management information in the fourth control unit.

11. A storage system, comprising:
a plurality of storage units configured to store data;
a first control unit configured to control data transferred by a plurality of control units, the first control unit including:
a channel adaptor configured to receive data transferred by the plurality of control units;
a disk adaptor configured to transfer data to the plurality of storage units and to receive data from the plurality of storage units, and
a memory configured to store data or information received from the channel adaptor and the disk adaptor; and
a communication cable that connects the first control unit and a second control unit,
wherein the first control unit is configured to communicate management information with the second control unit via the communication cable, and wherein based on the management information the first control unit and the second control unit are configured to determine common management information relating a plurality of data stored in the first control unit and the second control unit.

12. The storage system according to claim 11, wherein the management information includes a first guarantee time determined by the second control unit.

13. The storage system according to claim 12, wherein the common management information is based on a second guarantee time of the first control unit and the first guarantee time.

14. The storage system according to claim 13, wherein the first guarantee time is based on information for data stored in the second control unit.

15. The storage system according to claim 14, wherein the information for the data stored in the second control unit includes time information for data managed in the second control unit.

16. The storage system according to claim 15, wherein information for data stored in the first control unit includes time information for data managed in the first control unit, and wherein the first control unit and the second control unit are configured to determine the common management information based on the time information for the data managed in the first control unit and the time information for the data managed in the second control unit.

17. The storage system according to claim 14, wherein the second guarantee time is based on information for data transferred to the first control unit by the plurality of control units.

18. The storage system according to claim 17, wherein the information for the data stored in the first control unit is time information for data managed in the first control unit.

19. The storage system according to claim 11, further comprising a second communication cable that connects the first control unit and a third control unit; wherein the first control unit is configured to deliver the common management information to the third control unit via the second communication cable.

20. The storage system according to claim 19, wherein the common management information is used to determine another common management information in the third control unit.

* * * * *